United States Patent

Hoffman, Jr. et al.

[11] 3,917,032
[45] Nov. 4, 1975

[54] SINGLE MOUNT AND GUIDE PIN FOR A CALIPER OF A DISC BRAKE ASSEMBLY

[75] Inventors: Charles T. Hoffman, Jr., Dayton; Edward H. Warwick, Englewood, both of Ohio

[73] Assignee: General Motors Corporation, Detroit, Mich.

[22] Filed: Feb. 11, 1974

[21] Appl. No.: 441,240

[52] U.S. Cl. .............................................. 188/73.3
[51] Int. Cl.² ...................................... F16D 55/224
[58] Field of Search ................. 188/73.3, 72.4, 71.1

[56] References Cited
UNITED STATES PATENTS

| | | | |
|---|---|---|---|
| 3,530,493 | 9/1970 | Hollnagel et al. | 188/72.4 |
| 3,628,639 | 12/1971 | Daley, Jr. | 188/73.3 |
| 3,688,876 | 9/1972 | Hirai et al. | 188/73.3 |

FOREIGN PATENTS OR APPLICATIONS

| | | | |
|---|---|---|---|
| 1,154,701 | 6/1969 | United Kingdom | 188/73.3 |
| 1,072,115 | 12/1959 | Germany | 188/72.4 |
| 253,373 | 4/1967 | Austria | 188/72.4 |

Primary Examiner—Trygve M. Blix
Assistant Examiner—Edward R. Kazenske
Attorney, Agent, or Firm—D. D. McGraw

[57] ABSTRACT

A sliding caliper cooperates with an axially fixed rotatable disc to exert braking forces on the disc and transmit the braking torque from the caliper to a fixed support member. The caliper is slidably mounted on a single mount and guide pin which is fixed to the fixed caliper support. The caliper has a leg extending generally radially along one side of the disc, the leg having a cylinder formed therein and receiving the brake actuating piston. The leg also has an aperture through which the single mount and guide pin is received in sliding, guiding, and supporting relation. The leg has side surfaces positioned in circumferentially spaced relation relative to the disc and abutting mating surfaces on the fixed support member. The caliper is arcuately movable about the axis of the single guide and support pin to take up tolerance between the mating surfaces, depending upon the rotation of the disc during braking, the mating surfaces on the caliper leg transmitting brake torque to the fixed support member and effectively preventing arcuate movement of the caliper while permitting caliper removal from the disc when the single mount and guide pin is removed.

2 Claims, 3 Drawing Figures

SINGLE MOUNT AND GUIDE PIN FOR A CALIPER OF A DISC BRAKE ASSEMBLY

The invention relates to a disc brake assembly, and more particularly to one having an axially fixed disc and an axially slidable caliper. It is a feature of the invention that the caliper transmits brake torque to a fixed support member along one side of the disc while the caliper is slidably and arcuately rotatably mounted on a single mount and guide pin which extends axially parallel to the axis of the disc being braked and substantially perpendicular to the disc braking surface. This construction is advantageous in relation to previously known sliding caliper disc brakes in that it has fewer parts. It is also lighter in weight due to the reduction in number of parts. Less material is required since the fixed support member does not reach across the outer periphery of the disc. It has been common practice to mount sliding caliper disc brakes on mounting pins or guide them on a plurality of guide pins. Such arrangements require a plurality of mounting guiding ears on the caliper housing. The structure embodying the invention requires only one such ear, resulting in the use of less material, also contributing to a lighter weight. In addition, this arrangement simplifies the manufacture of the caliper housing when the housing is cast or otherwise fabricated. The mount and guide pin is not required to be sufficiently long to also extend across the disc periphery, resulting in a pin of lighter weight than is usually the case when a plurality of such pins are utilized. The disc brake assembly embodying the invention also contributes to easier machining of the support member since only one aperture is required to receive the single mounting bolt. When a caliper suspension utilizing two guide pins is used, as in the prior art, clearance between the pins and the holes in the caliper ears through which the pins extend must be greater than the clearance required when the single mount and guide pin of this invention is utilized. The additional clearance in the prior art is required to allow for movement when the brakes are applied, and the resilient bushings which are utilized must accommodate this movement. By use of this invention the clearance between the pin and the caliper support and guide opening can be smaller since all of the caliper movement due to braking action is rotational around the pin and axially on the pin and does not include a twisting moment on a plurality of pin locations.

It is another feature of the invention to provide clean, unexposed surfaces for the resilient bushings installed in the caliper frame and the mounting pin as the caliper slides to adjust for lining wear. This is accomplished by mounting one bushing in a recess formed in the caliper mounting bore and another bushing in axially spaced relation to the one bushing and in a recess formed in the mounting pin. The caliper slides so as to have the bushings approach each other as the linings wear, and the bushings therefore work on surfaces of the bore and pin which have been enclosed and sealed by the bushings. This results in less wear and tear on the bushings than would be the case if they had to work on surfaces which have been exposed to the elements for some period of time.

IN THE DRAWING

Figures 1, 2, 3:
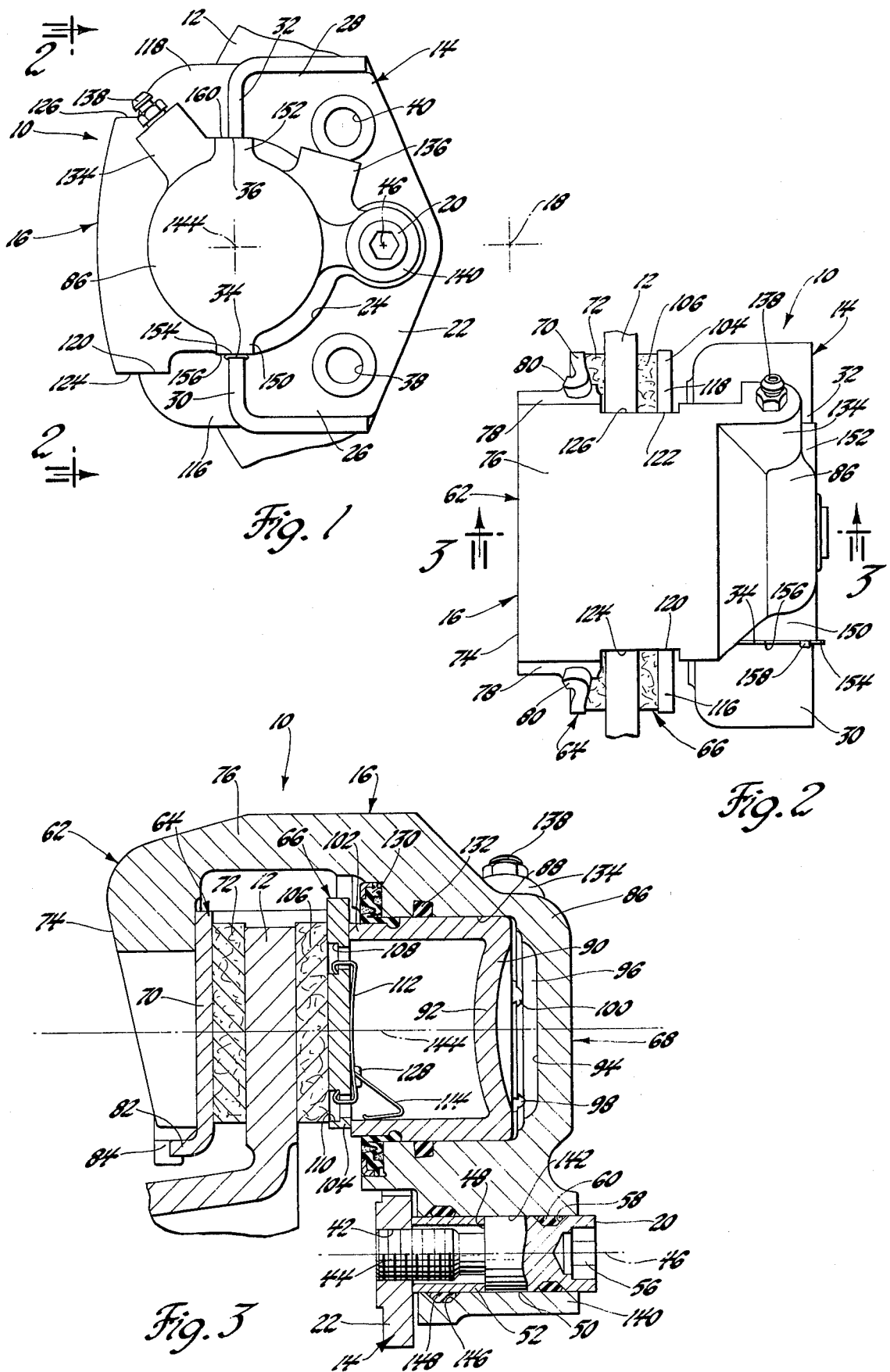
FIG. 1 is a side elevation view of a disc brake assembly embodying the invention.
FIG. 2 is an elevation view of the disc brake assembly of FIG. 1 taken in the direction of arrows 2—2 of that FIGURE and having parts broken away.
FIG. 3 is a cross section view of the assembly of FIGS. 1 and 2 taken in the direction of arrows 3—3 of FIG. 2 and having parts broken away.

The disc brake assembly 10 is illustrated in FIG. 1 as including a disc 12, a fixed support bracket 14 and a caliper assembly 16. The disc is mounted so as to rotate about its axis 18 with a vehicle wheel, as is well known in the art, and the support bracket is secured to a suitable non-rotating portion of the vehicle such as the steering knuckle of a front wheel suspension assembly. The caliper assembly is mounted on the support bracket so as to be slidable in a direction which is parallel to the disc axis of rotation 18. The caliper assembly is mounted on the fixed support bracket 14 by a single mounting pin or bolt 20. The mounting arrangement with pin 20 is best seen in FIG. 3.

The fixed bracket 14 is illustrated as being a welded or stamped bracket. However, other types of bracket manufacture may be utilized. In some installations the bracket may be cast as an integral part of the steering knuckle, for example. Such installations have been used in production vehicles and are well understood by those skilled in the art. The particular bracket illustrated has a base plate section 22 which is generally C-shaped to provide a recess 24 between arms 26 and 28. The arms are reinforced by flanges 30 and 32, respectively, which extend away from base plate section 22 in planes generally parallel to disc axis of rotation 18. The flanges 30 and 32 terminate at the ends of the arms adjacent recess 24 in respective end surfaces 34 and 36. These surfaces extend in planes which are substantially parallel to the axis of rotation 18 of disc 12. The planes may also be parallel to each other, or may be somewhat divergent in a direction away from the axis of rotation 18 so that they permit the removal of the caliper assembly radially outward relative to disc 12, as will be seen. The base plate section 22 of bracket 14 is illustrated as being provided with a pair of reinforced bracket mounting holes 38 and 40 which suitably provide for fixedly mounting the bracket to a suitable vehicle member as above described. The bracket is also provided with a threaded aperture 42 which is axially parallel to the disc axis of rotation 18 and which provides the arrangement for securing the mounting pin 20 to the bracket.

Mounting pin 20 is best illustrated in FIG. 3 and includes an outboard threaded end 44 which is threaded into aperture 42 so that the pin extends with its axis 46 parallel to the disc axis of rotation 18. Also, pin 20 extends outwardly of bracket 14 in the direction away from disc 12. Pin 20 has a shoulder 48 formed thereon and positioned generally in the center of the length of the pin. The outer surface 50 of the pin extending away from shoulder 48 is of a larger diameter than the threaded end 44 and provides a sliding surface for the caliper housing. A sleeve 52 of the same outer diameter as the pin outer surface 50 is received about a portion of the pin threaded end 44 and has one end abutting bracket 14 circumferentially about aperture 42 and the other end abutting pin shoulder 48. The inboard end of pin 20 has a socket 56 recessed therein and arranged to receive a suitable tool for installing and removing the pin. When the pin is tightly threaded into aperture 42, sleeve 52 is placed in compression and provides a greater effective length for the threaded portion of the pin, thereby improving the retentive characteristics of the pin. This arrangement is similar to that disclosed in U.S. Pat. No. 3,628,639, "entitled Disc Brake Caliper-Mounting Means," issued Dec. 21, 1971.

The pin outer surface 50 has an annular recess 58 formed therein which receives a resilient bushing 60. This arrangement is similar to that disclosed in the above noted patent with the exception that the pin outer surface 50 has a sliding fit with the caliper frame bore through which it extends, as will be described below.

The caliper assembly 16 includes a caliper housing or frame 62 which is slidably mounted on bracket 14, an outboard brake pad assembly 64, an inboard brake pad assembly 66, and a piston and cylinder section 68. The outboard brake pad assembly 64 includes a shoe 70 and a brake lining 72 secured to the shoe. Assembly 64 is mounted on the caliper frame outboard leg 74. The outboard leg 74 extends radially inward from the frame bridge section 76 along the outboard side of the disc 12. It has a pair of circumferentially spaced ledges 78 over which brake shoe tabs 80 of the shoe 70 are bent to prevent the assembly 64 from moving radially inward relative to the disc. The shoe 70 also has a flange 82 which engages abutments 84 on outboard leg 74 to prevent radially outward movement of assembly 64 relative to the disc. The abutments 84 act, with tabs 80 and ledges 78, to prevent arcuate movement of the assembly 64 and transmit braking forces from the assembly to the caliper's frame.

The inboard leg 86 of the caliper frame is formed with a cylinder 88 in which piston 90 is reciprocably received. Cylinder 88 and piston 90 are parts of the piston and cylinder section 68. Piston 90 has a head 92 cooperating with cylinder 88 and the cylinder end wall 94 to define the actuating chamber 96. Pressure opening 98 and bleed opening 100 are provided so that hydraulic brake fluid is introduced into chamber 96 through opening 98 when the brake actuated, and air may be bled from the brake through opening 100 when necessary. The outer end 102 of piston 90 engages the back side of shoe 104 of inboard brake pad assembly 66. The shoe has a lining 106 secured to the other side thereof and positioned for braking engagement with the inboard side of disc 12. Shoe 104 has a pair of shouldered apertures 108 and 110 which provide a mounting for shoe retaining spring 112. Spring 112 is clipped to the back side of brake shoe 104, with hooked ends engaging the shoulders of the apertures so as to hold the spring in position. The spring has a leg 114 extending inwardly into piston 92 and resiliently engaging the piston inner surface so that the brake pad assembly 66 is urged radially outwardly relative to the disc 12. The shoe 104 engages a mating portion of the caliper bridge section 76 so that it is positioned in the caliper in proper relation to the disc. The circumferentially spaced ends 116 and 118 of shoe 104 extend radially outward beyond a portion of bridge section 76 and are provided with surfaces 120 an 122, respectively. These surfaces respectively engage the side surfaces 124 and 126 of the frame bridge section 76 so that braking forces from pad assembly 66 are transmitted to the caliper frame 62. The brake shoe 104 is also provided with a pair of buttons 128 on either side of spring 112 and so spaced that they are in incipient engagement with the inner surfaces of piston 90 so that they further assist in locating the brake pad assembly 66.

A dust seal 130 is secured to the piston 90 and in the outer end of cylinder 88. A pressure seal 132 is received in a seal recess formed in the wall of cylinder 88 and engaging the outer surface of piston 90. This seal retains hydraulic fluid within chamber 96.

The inboard leg 86 of caliper frame 62 is also provided with suitable bosses 134 and 136. Boss 134 has bleed opening 100 formed therethrough and receiving bleed fitting 138. Boss 136 has a pressure opening 98 formed therethrough and provides for connection of the opening with a brake hose or other suitable brakd fluid conduit, as is well known in the art. The inboard caliper leg 86 extends radially inward from the cylinder section 68 relative to disc 12 and terminates in an ear 140. Bore 142 is formed through ear 140 so that it is axially parallel to the axis 144 of piston 90 and cylinder 88. The inner surface of bore 142 is a sliding fit with the outer surface 50 of mounting pin 20 and the continuing outer surface of sleeve 52. A recess 146 is formed in the bore surface of the bore 142 near the bore end extending toward disc 12. Resilient bushing 148 is received in recess 146 and engages the outer surface of sleeve 52.

The caliper assembly is illustrated in the drawing in the mounting position assumed when the brake linings are unworn. Each time the brake is actuated, piston 90 forces lining 106 into braking engagement with disc 12 and hydraulic reaction acting on the cylinder end wall 94 urges the caliper frame 62 rightwardly as seen in FIG. 3 to force lining 72 into braking engagement with the other side of disc 12. Sliding movement of the caliper frame rightwardly on mounting pin 20 occurs. This is initially due to slight compression of the linings and spread of the caliper legs. As the brake is released the caliper legs recover, as do the linings, and the caliper frame is returned to substantially the same portion as before. As the brake linings wear, however, the caliper frame must be moved further rightwardly while the piston 90 is moved leftwardly relative to the release position illustrated. The seal 132 will grip the piston 90 so that it does not return to the release position, and bushings 60 and 148 will act in a similar manner between the frame bore 142 and the pin and sleeve extending therethrough. It can be seen that as the linings become more worn, the caliper frame is positioned further and further rightward on pin 20 and sleeve 52. By mounting bushing 60 in a recess in pin 20 and bushing 148 in a recess in the caliper frame so that the bushings approach each other so the caliper frame moves rightwardly on pin 20 and sleeve 52, the bushings continue to work on surfaces which have not been exposed to the atmosphere and to the deteriorating effects normally occurring on exterior surfaces located adjacent vehicle wheels. By suitably lubricating the fitting surfaces between bushings 60 and 148 during installation, the surfaces are retained in a clean and lubricated condition so long as they are in a position to be engaged by the bushings upon further lining wear. This minimizes damage to the bushings 60 and 148 and increases the uniformity of sliding action throughout the life of the linings.

The outer surface of the portion of inboard leg 86 in which cylinder 88 is formed has oppositely extending flanges 150 and 152 which are in brake force transmitting alignment with flanges 30 and 32 of the fixed support bracket 14. The flanges 150 and 152 are preferably substantially in alignment with the axis 144 of the cylinder 88, as can be seen in FIG. 1. A caliper damping spring 154 is preferably mounted between the surface 156 of one of the flanges, for example flange 150, and the end surface of the one of the fixed bracket flanges cooperating therewith. Spring 154 is formed of a flat spring material and provided with suitable tabs 158 at either spring end to hold the spring in place. The spring is preformed to a bowed configuration in its free form so that it urges the caliper frame into direct engagement with the end surface 36 of flange 32 along surface 160 of flange 152. Thus the spring 154 takes up tolerance in this area and damps arcuate caliper movement. Due to the small clearance between flange 30 and flange 150 the spring is substantially flat at all times.

When the brake assembly is installed and actuated, the caliper assembly 16 can move arcuately about mounting pin 20 to the extent allowed by the tolerance between the mating flanges of the caliper frame and fixed support bracket. Depending upon the direction of rotation of disc 12, the braking forces transmitted to the caliper frame from the brake pad assemblies are transmitted either from flange 150 to flange 30 through spring 154 or from flange 152 to flange 32. The forces are thus transmitted to the fixed support bracket 14 and other fixed portions of the vehicle. When it is desired to remove the caliper assembly for some reason such as replacement of the brake pad assemblies, only the single mounting pin 20 need be removed, after which the caliper assembly may be moved radially outward relative to the disc to facilitate brake pad assembly replacement.

The construction and arrangement of the disc brake assembly is compact and requires less parts than do sliding caliper brakes mounted or guided on a plurality of pins. By positioning the fixed support bracket so that it takes brake forces along a substantial flange length extending parallel to the actuating cylinder axis, while locating the flange only on one side of the disc, less material is required and the entire assembly is less bulky as compared to brakes which have the fixed support member reaching across the outer periphery of the disc.

What is claimed is:

1. A sliding caliper mount for a disc brake, said mount comprising:
   a caliper housing having a bore therethrough,
   a caliper mounting member including a fixed support and a caliper mount and guide pin secured to said support and extending through said bore,
   a first resilient bushing received in a groove formed in said bore adjacent one end thereof and supporting said pin in sliding and rotating relation,
   a second resilient bushing received in a groove formed in said pin adjacent one end thereof and supporting said caliper housing at said bore in sliding and rotating relation,
   said first and second bushings being relatively positioned so as to approach each other when the disc brake is actuated,
   and means on said caliper and said fixed support for transmitting brake torque therebetween and limiting the rotational movements of said caliper housing about said pin.

2. A sliding mounting and guiding mechanism for a disc brake sliding caliper, said mechanism comprising:
   a caliper mounting pin assembly including a bolt having one section providing a cylindrical sliding surface and another section providing a reduced diameter threaded end and a shoulder at the juncture of said sections, a sleeve extending over a portion of said bolt another section and having one end abutting said shoulder and a cylindrical sliding surface forming an effective continuation of said bolt cylinder sliding surface;
   a fixed support bracket having a base plate section, a pair of brake force-receiving arms extending from said base plate section and provided with brake force-receiving slide surfaces, and a mount including a threaded aperture through said base plate section threadably receiving said bolt threaded end, the other end of said sleeve abutting said base plate section and thereby placing said sleeve in compression and said portion of said bolt another section in tension with said bolt threaded tightly into said base plate section;
   a caliper housing having a mounting ear provided with a bore therethrough which said caliper mounting pin assembly extends in relative sliding relation, a cylinder section extending axially parallel to said bore and having axially acting brake actuating means therein, and a pair of flanges with one on each side of said cylinder section and having brake force-transmitting slide surfaces operatively engaging said support bracket brake force-receiving slide surfaces;
   said caliper housing bore a circumferentially extending recess formed therein adjacent one end thereof and positioned axially between said sleeve ends and having a circumferentially extending first resilient bushing therein engaging said sleeve cylindrical sliding surface in sealing and sliding relation, said bolt cylindrical sliding surface having a circumferentially extending recess formed therein and having a circumferentially extending second resilient bushing therein engaging said caliper housing bore in sealing and sliding relation, said caliper housing being progressively moved slidably on said mounting pin assembly to take up lining wear and said resilient bushings moving toward each other during such housing progressive movement to slidably progressively engage bore and pin assembly sliding surfaces which are sealed between said bushings.

* * * * *

UNITED STATES PATENT AND TRADEMARK OFFICE
CERTIFICATE OF CORRECTION

PATENT NO. : 3,917,032
DATED : November 4, 1975
INVENTOR(S) : Charles T. Hoffman, Jr. and Edward H. Warwick It is certified that error appears in the above-identified patent and that said Letters Patent are hereby corrected as shown below:

```
Column 3, line 30, change "caliper's" to -- caliper --;
          line 39, after "brake" insert -- is --.
Column 4, line 11, "brakd" should be -- brake --;
          line 20, delete "the" (second occurrence);
          line 36, change "portion" to -- position --;
          line 39, after "moved" insert -- further --.
Column 6, claim 2, line 31, after "therethrough" insert
                            -- through --;
                   line 40, after "bore" insert -- having --.
```

Signed and Sealed this second Day of March 1976

[SEAL]

Attest:

RUTH C. MASON
Attesting Officer

C. MARSHALL DANN
Commissioner of Patents and Trademarks